(12) United States Patent
Phung et al.

(10) Patent No.: US 7,640,370 B1
(45) Date of Patent: Dec. 29, 2009

(54) METHOD AND APPARATUS FOR CONTROLLING DATA TRANSFER BETWEEN EEPROM AND A PHYSICAL LAYER DEVICE

(75) Inventors: Trinh Phung, San Jose, CA (US); William Lo, Cupertino, CA (US)

(73) Assignee: Marvell International Ltd., Hamilton (BM)

( * ) Notice: Subject to any disclaimer, the term of this patent is extended or adjusted under 35 U.S.C. 154(b) by 48 days.

(21) Appl. No.: 11/751,593

(22) Filed: May 21, 2007

Related U.S. Application Data

(62) Division of application No. 10/723,693, filed on Nov. 25, 2003, now abandoned.

(51) Int. Cl.
*G06F 13/00* (2006.01)
*G06F 13/14* (2006.01)
*G06F 13/36* (2006.01)
*H04L 12/66* (2006.01)

(52) U.S. Cl. .................. 710/8; 710/104; 710/305; 710/306; 710/311; 710/312; 713/1; 370/463; 709/220

(58) Field of Classification Search ............ None
See application file for complete search history.

(56) References Cited

U.S. PATENT DOCUMENTS

| | | | |
|---|---|---|---|
| 5,101,490 | A | 3/1992 | Getson, Jr. et al. |
| 5,502,822 | A * | 3/1996 | Takebe ............ 710/316 |
| 6,260,172 | B1 | 7/2001 | Hazama |
| 6,282,643 | B1 | 8/2001 | Cromer et al. |
| 6,285,819 | B1 | 9/2001 | Jeong |
| 6,543,008 | B1 | 4/2003 | Ninomiya |
| 6,859,614 | B1 | 2/2005 | Cho |
| 6,906,426 | B2 | 6/2005 | Sefidvash |
| 2004/0030805 | A1 | 2/2004 | Fujimori et al. |
| 2004/0225875 | A1 | 11/2004 | Huang et al. |

FOREIGN PATENT DOCUMENTS

EP    0858040 A2    12/1998

OTHER PUBLICATIONS

Merriam-Webster's Collegiate Dictionary, Tenth Edition, 1997—p. 142.*
"Small Form-factor Pluggable (SFP) Transceiver MultiSource Agreement (MSA)", Sep. 14, 2000, pp. 1-38.
Gigabit Interface Converter (GBIC), Revision 5.1, SF document No. INF-8053i; Jul. 6, 1998, published by Sun Microsystems, Inc., Mountain View, California, 72 pp.

(Continued)

*Primary Examiner*—Tanh Q Nguyen

(57) ABSTRACT

An IEEE 802.3 compliant physical layer device provides efficient loading of configuration information of the physical layer device. The configuration information is written into a volatile memory in the physical layer device, and then uploaded to at least one EEPROM. The configuration information is downloaded to the volatile memory during startup of the physical layer device. The system controller can also directly access the EEPROMs, bypassing the volatile memory. By providing a bridge between the system controller and the EEPROMs and providing additional bits in the volatile memory of the physical layer device, the system controller can read and write the EEPROMs one byte at a time. During reset time, the content of the EERPOMs is written to registers in the physical layer device to configure the physical layer device.

36 Claims, 7 Drawing Sheets

OTHER PUBLICATIONS

Ghiasi (Ed.), "XFP WAN MAN LAN SAN (10 Gigabit Small Form Factor Pluggable Module)," Revision 3.1, Adopted Revision, Apr. 2, 2003, 175 pp., San Jose, CA.

"Xenpak 10 Gigabit Ethernet MSA, a Cooperation Agreement for 10 Gigabit Ethernet Transceiver Package," Issue 3.0, Sep. 18, 2002, 77 pp.

"Xenpak 10 Gigabit Ethernet MSA, A Cooperation Agreement for 10 Gigabit Ethernet Transceiver Package," Issue 2.1, Feb. 15, 2002, 61 pp.

"Xenpak 10 Gigabit Ethernet MSA, A Cooperation Agreement for 10 Gigabit Ethernet Transceiver Package," Issue 2.0, Sep. 26, 2001, and Xenpak MSA Rev. 2.0, Addendum 1, Dec. 5, 2001; 63 pp.

"Xenpak MSA, A Cooperation Agreement for 10 Gigabit Ethernet Transceiver Package," Issue 1.0, May 1, 2001, 54 pp.

"IEEE Standards 802.3ae (Amendment to IEEE Std 802.3-2002), IEEE Standard for Information technology—Telecommunications and information exchange between systems—Local and metropolitan area networks—Specific requirements, Part 3: Carrier Sense Multiple Access with Collision Detection (CSMA/CD) Access Method and Physical Layer Specifications, Amendment: Media Access Control (MAC) Parameters, Physical Layers, and Management Parameters for 10 Gb/s Operation, IEEE Computer Society," IEEE Standards, Aug. 30, 2002, 516 pp., The Institute.

* cited by examiner

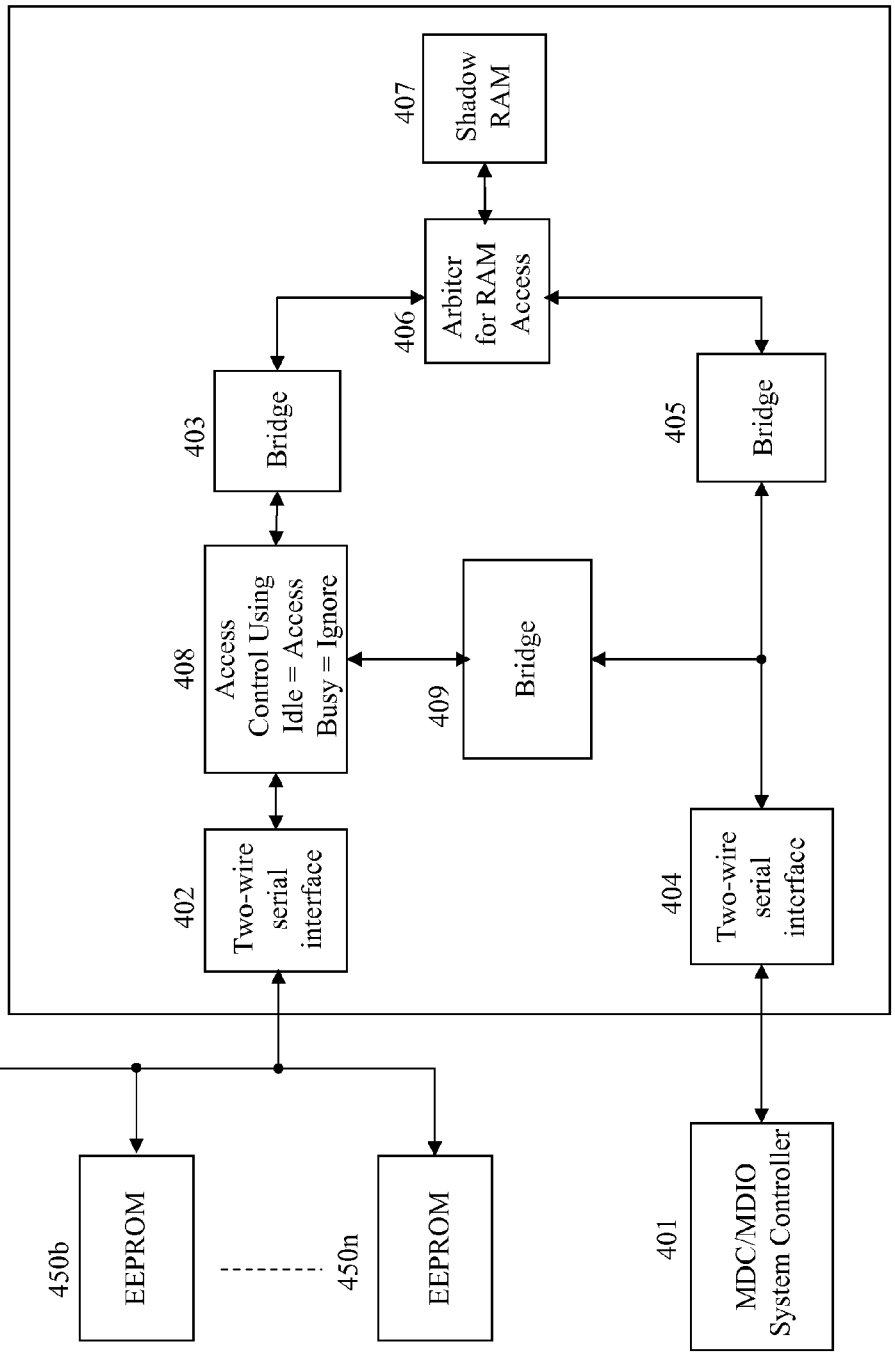

METHOD AND APPARATUS FOR CONTROLLING DATA TRANSFER BETWEEN EEPROM AND A PHYSICAL LAYER DEVICE

CROSS-REFERENCE TO RELATED APPLICATIONS

This application is a divisional application of U.S. application Ser. No. 10/723,693 filed Nov. 25, 2003, now abandoned.

BACKGROUND OF THE INVENTION

1. Field of the Invention

The present invention relates to data transfer, and more specifically to efficiently controlling data transfer between non-volatile memories and an IEEE 802.3 compliant physical layer device.

2. Description of the Related Art

FIG. 1 shows a part of the 10 Gigabit Ethernet architecture according to the IEEE 802.3ae, Carrier Sense Multiple Access with Collision Detection (CSMA/CD) Access Method and Physical Layer Specification, 2002 ("the IEEE 802.3ae Standard"). A MAC (Media Attachment Control) sublayer 101 connects a chip 100 consisting of a PMA (Physical Media Attachment) sublayer 103 and a PMD (Physical Media Dependent) sublayer 104 through a PCS (Physical Code Sublayer) 102. Although the PMA 103 and the PMD 104 are two logical blocks, they are conventionally grouped into one chip called PMA PMD, because both of them are analog related.

More and more manufacturers configure the PMD 104 according to Xenpak 10 Gigabit Ethernet MSA, a Cooperation Agreement for 10 Gigabit Ethernet Transceiver Package, versions 1.0, 2.0, 2.1 and 3.0 ("the Xenpak Specification"). The Xenpak Specification provides guidelines for pluggable fiber optic transceiver modules supporting implementations of the IEEE 802.3ae Standard. The Xenpak Specification requires that certain information, including the indication of transceiver capabilities, should be maintained in a set of external non-volatile memories, such as EEPROM (Electrically Erasable and Programmable Read Only Memory). Meanwhile, a physical layer device includes registers for storing instructions and data. The instructions and data can be downloaded to the registers from the non-volatile memories and uploaded from the registers to the non-volatile memories. The instructions and data are retained in the non-volatile memories when the power is lost and reloaded to the registers in the physical layer device with return of the power. A system controller controls the physical layer device to upload information from the registers in the physical layer device, thus updating the content of the non-volatile memories.

According to the Xenpak Specification, a top register 0x8000 is used for EEPROM control and status. This register defines commands and command statuses, but does not provide EEPROM address. To change one byte of information, the conventional method downloads the entire content of the EEPROM or uploads the entire content of the registers in the physical layer device. Consequently, the data transfer takes a long time and it is difficult to control other devices that can share the bus with an EEPROM.

Conventionally, pins are used to configure physical layer devices. After a chip is made, it is very difficult to change the pins and the configuration of the physical layer devices.

Therefore, it would be advantageous to provide an IEEE 802.3 compliant physical layer device which can transfer physical layer device configuration information with EEPROMs more efficiently and which can be configured more flexibly. It would also be advantageous to provide an IEEE 802.3 compliant physical layer device which facilitates control of devices sharing the bus with an EEPROM.

SUMMARY OF THE INVENTION

It is an object of the present invention to provide an IEEE 802.3 compliant physical layer device which facilitates efficient transfer of physical layer device configuration information with non-volatile memories in a physical layer device. According to the present invention, additional bits are provided in the volatile memory or memories in the physical layer device to indicate the status of data transfer. As a result, the system controller can read and write the non-volatile memories one byte at a time. When an error is detected, the system controller can efficiently locate the relevant data bytes without downloading the entire content of the non-volatile memories or uploading the entire content of the volatile memories. Consequently, the present invention reduces the non-volatile memory access time if a small number of data bytes in the non-volatile memory need to be accessed, and facilitates control of other devices sharing the bus with the non-volatile memory.

It is a further object of the present invention to provide an IEEE 802.3 compliant physical layer device which can be configured more flexibly. During reset time, the content of the non-volatile memories can be written to any PMA registers, PMD registers, PHY registers, and PCS (Physical Code Sublayer) registers. The present invention allows configuration of the physical layer devices flexibly after the physical layer device chip is made and reduces the number of chip pins used for configuration.

It is a further object of the present invention to provide an IEEE 802.3 compliant physical layer device which allows a system controller to directly access a non-volatile memory or a device sharing the bus with the non-volatile memory, bypassing a volatile memory in the physical layer device.

It is a further object of the present invention to provide an IEEE 802.3 compliant physical layer device which allows loading of configuration information of the physical layer device from a non-volatile memory to a volatile memory in the physical layer device without identifying the master.

BRIEF DESCRIPTION OF THE DRAWINGS

The present invention is described herein with reference to the accompanying drawings, similar reference numbers being used to indicate functionally similar elements.

FIG. 4A shows a block diagram of an IEEE 802.3 compliant physical layer device according to another embodiment of the present invention.

DETAILED DESCRIPTION OF EMBODIMENTS

Figure 1:
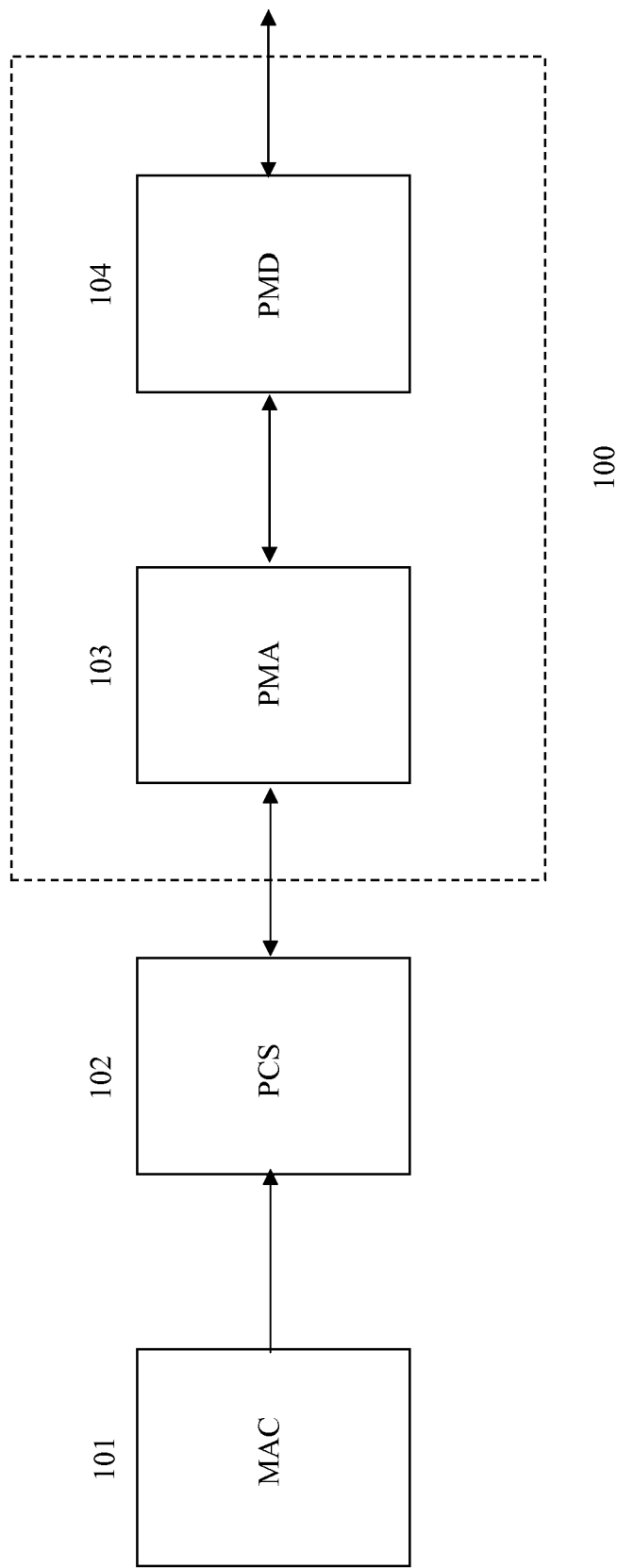
FIG. 1 shows a part of the 10 Gigabit Ethernet architecture according to the IEEE 802.3ae Standard.
Figure 2:
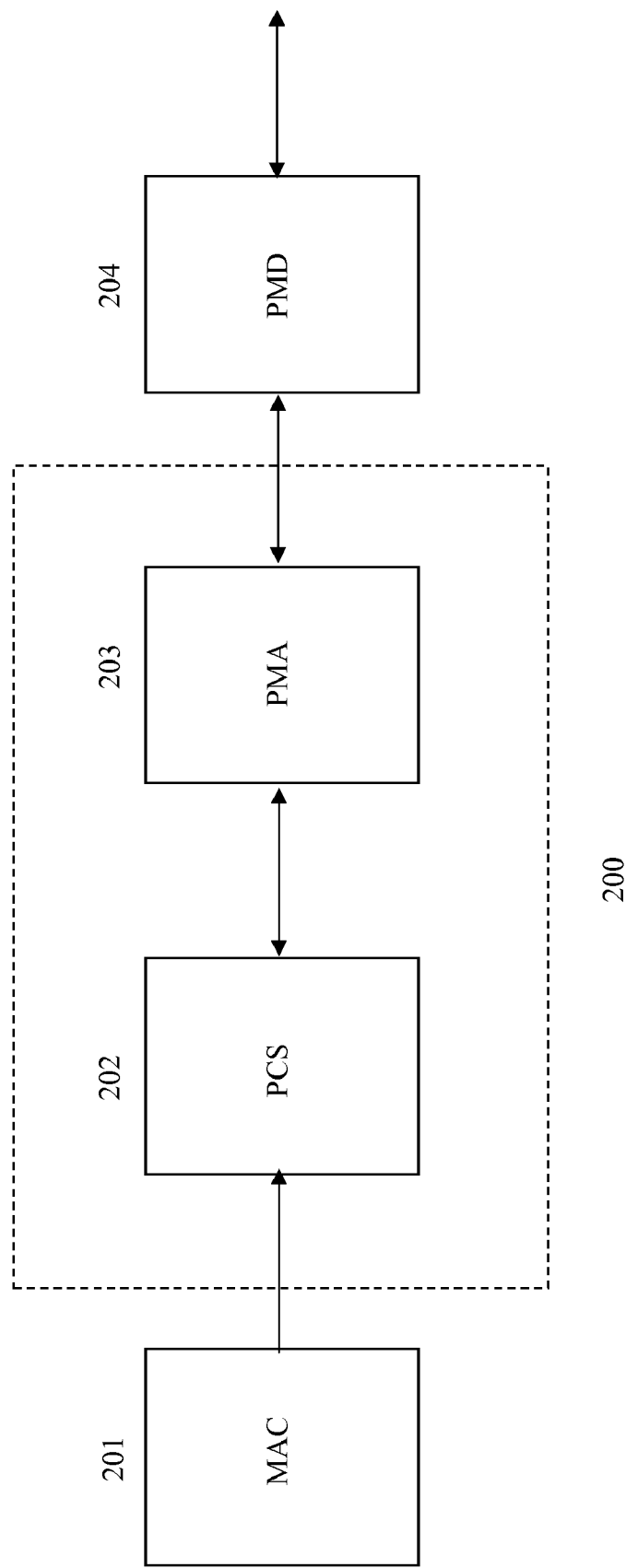
FIG. 2 shows a part of the 10 Gigabit Ethernet architecture employing one embodiment of the present application.

FIG. 2 shows a part of the 10 Gigabit Ethernet architecture employing one embodiment of the present application. The embodiment shown in FIG. 2 puts a PCS 202 and a PMA 203 into a chip 200. The chip 200 may be a CMOS chip. Thus, only half of the PMA PMD, a device according to the IEEE 802.3ae Standard, is outside the chip, while the other half is inside the chip. To enable the PCS 202 of the present invention to be IEEE 802.3ae Standard compliant, the chip 200 uses MDC (Management Data Clock) and MDIO (Management Data I/O) to communicate with a system controller, MAC (Media Access Control) sublayer 201, which controls the entire communication channel.

Figure 3:
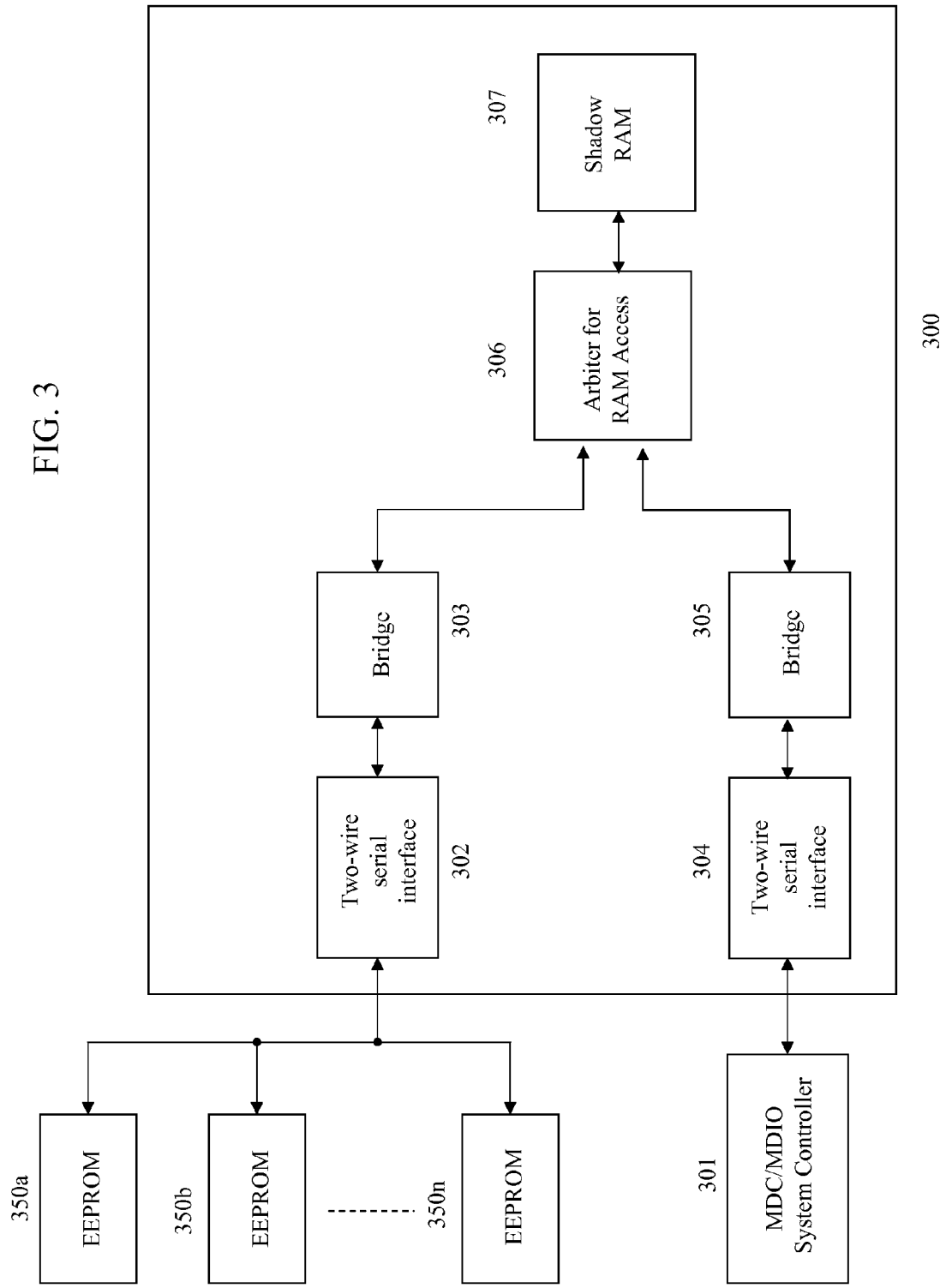
FIG. 3 shows a block diagram of an IEEE 802.3 compliant physical layer device according to one embodiment of the present invention.

FIG. 3 shows a block diagram of an IEEE 802.3 compliant physical layer device according to one embodiment of the present invention. In one embodiment, a physical layer device 300 is configured according to the Xenpak Specification. Physical layer device configuration information and instructions used by a system controller 301 are stored in EEPROMs 350a to 350n. The content of the EEPROMs can be downloaded to a shadow RAM 307 in the physical layer device 300, and updated by uploading the content of the shadow RAM 307. Specifically, on start up, the EEPROM contents are dumped into the shadow RAM 307. When the system controller 301 wants to read the EEPROMs, it reads the shadow RAM 307. When the system controller 301 wants to write to the EEPROMs, it writes the shadow RAM 307, and then the entire contents of the shadow RAM 307 are dumped into the EEPROMs.

When both the system controller 301 and the EEPROMs 350 want to access the shadow RAM 307 at the same time, an arbiter for RAM access 306 gives the priority to the system controller 301. The EEPROMs can access the shadow RAM 307 only after data transfer between the system controller 301 and the shadow RAM 307 is finished.

In this embodiment, the physical layer device 300 uses a two-wire serial interface bus 302 to access the EEPROMs 350, and a two-wire serial interface bus 304 to communicate with the system controller 301. It should be understood that the present invention can be used with other types of buses as well. Bridges 303 and 305 are used to filter the traffic.

Most of the time the system controller 301 controls the communication channels through MDC, MDIO and the shadow RAM 307. The instructions and physical layer device configuration information are retained in the EEPROMs 350 when power is lost, and are reloaded to the shadow RAM 307 when power returns. When it is time to update the content of the EEPROMs, the system controller 301 writes the updates to the shadow RAM 307 first, and then uploads the content of the shadow RAM 307 to the EEPROMs.

Skilled artisans would appreciate that the physical layer device 300 shown in FIG. 3 further comprises EEPROM readers and register configurators, and some portions of the PMD, PMA, and PCS. These circuits are omitted from FIG. 3 for the sake of brevity.

FIG. 4A shows a block diagram of an IEEE 802.3 compliant physical layer device according to another embodiment of the present invention. In addition to the blocks shown in FIG. 3, a physical layer device 400 further comprises an access control interface 408 and a bridge 409. The bridge 409 enables transferring data to and from the EEPROMs one byte at a time by defining a set of registers. In one embodiment, the bridge 409 defines the following three registers: 1.8001, 1.8002, and 1.8003.

| Non-Volatile Memory Address Register | | | | | |
|---|---|---|---|---|---|
| Register | Function | Setting | Mode | HW Rst | SW Rst |
| 1.8001.15:9 | Bus Address | Bus Address | R/W | 0000000 | Retain |
| 1.8001.8 | Read/Write | 1 = Read, 0 = Write | R/W | 1 | Retain |
| 1.8001.7:0 | Byte Address | Byte Address | R/W | 00 | Retain |

| Non-Volatile Memory Read Data and Status Register | | | | | |
|---|---|---|---|---|---|
| Register | Function | Setting | Mode | HW Rst | SW Rst |
| 1.8002.15:11 | Reserved | 00000 | RO | 0000000 | 0000000 |
| 1.8002.10:8 | I2C Status | 000 = Ready<br>001 = Command Done - No Error<br>010 = Command in Progress<br>011 = Write done but readback failed<br>100 = Attempt to write protected location no write command issued<br>101 = Command Failed<br>110 = Reserved<br>111 = Bus Busy, Command Ignored | RO, LH | 00 | 00 |
| 1.8002.7:0 | Read Data | Read Data | RO | 00 | 00 |

Non-Volatile Memory Write Data and Control Register

| Register | Function | Setting | Mode | HW Rst | SW Rst |
|---|---|---|---|---|---|
| 1.8003.15:12 | EEPROM Write Time | 0000 = EEPROM takes 0 ms to write<br>0001 = 1.05 ms<br>... | R/W | 1010 | Retain |
| 1.8003.11:10 | Reserved | 00 | R/W | 00 | Retain |
| 1.8003.9 | Automatic read back after write | 1 = Read back, 0 = no read back | R/W | 0 | Retain |
| 1.8003.8 | Bus Speed | | R/W | 0 | Retain |
| 1.8003.7:0 | Write Data | Write Data | R/W | 00 | Retain |

When a read operation to the EEPROM is required, the byte address is written to register 1.8001.15:9 and 1.8001.7:0 respectively with register 1.8001.8 set to 1. Once the register 1.8001 is written, a read operation commences only if the bus is free. The byte that is read is stored in register 1.8002.7:0. The status of the read operation is stored in register 1.8002.10:8.

While the read operation is pending, register 1.8002.10:8 is set to 010. Once the read operation is completed, the register 1.8002.10:8 is set to 001, indicating that the read operation completed without error. The register 1.8002.10:8 is set to 101 if the read command is aborted when the EEPROMs do not acknowledge properly. The register 1.8002.10:8 is set to 111 if the bus is busy when register 1.8001 was written.

When a write operation to the EEPROM is required, the data byte should first be written into 1.8003.7:0. The byte address is written to registers 1.8001.15:9 and 1.8001.7:0 respectively with register 1.8001.8 set to 0. Once the register 1.8001 is written, a write operation to the EEPROM commences only if the bus is free and the address is a non-protected address location. If the read back bit is set in register 1.8003.9, a read operation to the same address is performed after the write operation. The byte that is read is stored in register 1.8002.7:0. The status of the write operation is stored in register 1.8002.10:8.

While the write operation is pending, register 1.8002.10:8 is set to 010. Once the write operation is completed, register 1.8002.10:8 is set to 001, indicating the write operation completed without error. The register 1.8002.10:8 is set to 011 is returned if the write operation is successfully completed but the read back command is aborted, and is set to 100 when a write operation to a protected address location is attempted. The register 1.8002.10:8 is set to 101 if the write command is aborted when the EEPROMs do not acknowledge properly. The register 1.8002.10:8 is set to 111 if the bus is busy when register 1.8001 was written.

Thus, when an error is detected, the present invention efficiently locates a byte and changes it, without transferring the entire content of the EEPROMs or the shadow RAM, thus shortening the EEPROM access time.

In FIG. 4A, there are two bridges accessing the EEPROMs: the bridge 403, and the bridge 409. The access control interface 408 is used to control the access to the EEPROMs. The system controller 401 should not try to access the EEPROMs via the two bridges at the same time. However, if the system controller 401 makes a mistake, the newer access request will be ignored by the access control interface 408. Specifically, when the access control interface 408 is idle, a request to access the EEPROMs will be allowed. But when the access control interface 408 is busy, the on-going data transfer will continue and a new access request will be ignored by the access control interface 408.

Thus, the physical layer device 400 shown in FIG. 4A provides the system controller 401 two ways to access the EEPROMs. When the entire content of the EEPROMs 450 need to be changed, the system controller 401 writes the updates to the shadow RAM 407 via a two-wire serial interface bus 404, a bridge 405, and an arbiter for RAM access 406, and then uploads the updates in the shadow RAM 407 to the EEPROMs 450s via a bridge 403, an access control interface 408 and a two-wire serial interface bus 402. When only a few bytes in the EEPROM need to be changed, the system controller 401 writes to the EEPROMs through the two-wire serial interface bus 404, the bridge 409, the access control interface 408, and the two-wire serial interface bus 402, without accessing the shadow RAM 407. When the additional bits in the shadow RAM 407 indicates that a couple of bytes written to the shadow RAM 407 are wrong, the system controller 401 goes through the bridge 409 to obtain appropriate information from the EEPROMs 450 and put it into the shadow RAM 407 via the bridge 405. Thus, the present invention allows the system controller to directly access the EEPROMs, bypassing the shadow RAM 407.

Figure 4B:
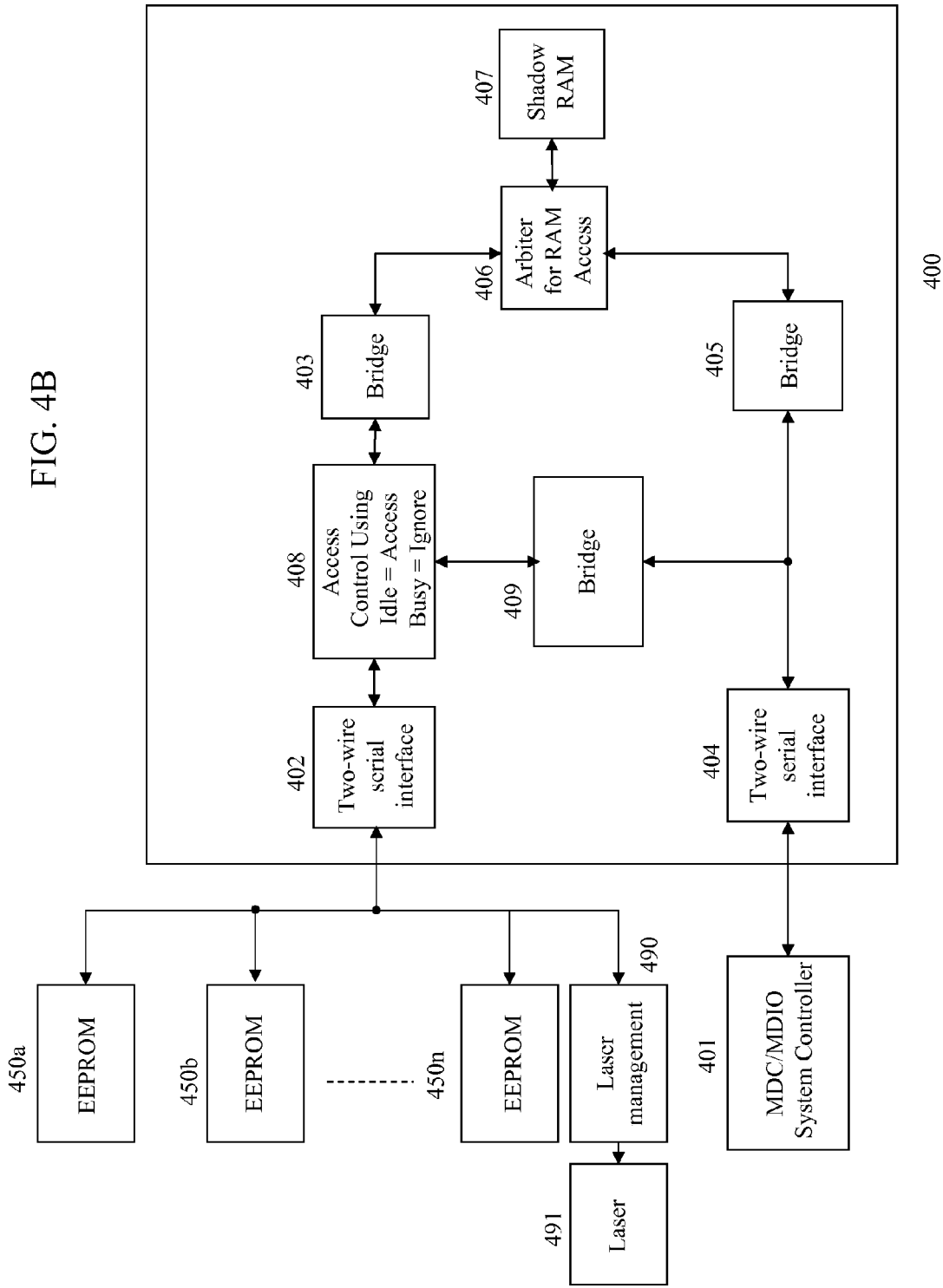
FIG. 4B shows a block diagram of an IEEE 802.3 compliant physical layer device according to a further embodiment of the present invention.

FIG. 4B shows a block diagram of a physical layer device according to another embodiment of the present invention. The structure is quite similar to that of FIG. 4A, but is slightly different, as follows. As shown, a laser management chip 490 shares the bus 402 with the EEPROMs 450. By properly assigning the EEPROM byte address and the laser management byte address, the present invention allows the system controller 401 to directly access the laser management chip 490, which controls a laser 491. For example, the laser management chip 490 may contain non-volatile memory which can be written to, thus allowing the laser to be tuned during manufacture, or even during field use, thus improving yield. In addition, some aspects of laser status, such as laser temperature, power, and the like, may be monitored during normal operation. The system controller 401 may read the associated data and take some corrective or other action, such as shutting down the laser in the event of fault detection. In any event, laser management can take several forms, some of which are mentioned here merely by way of example, and others of which will be well known to those skilled in the art.

According to one embodiment, three bits indicates the data transfer status. Skilled artisans would appreciate that fewer bits can be used to indicate fewer types of data transfer status.

Figure 5:
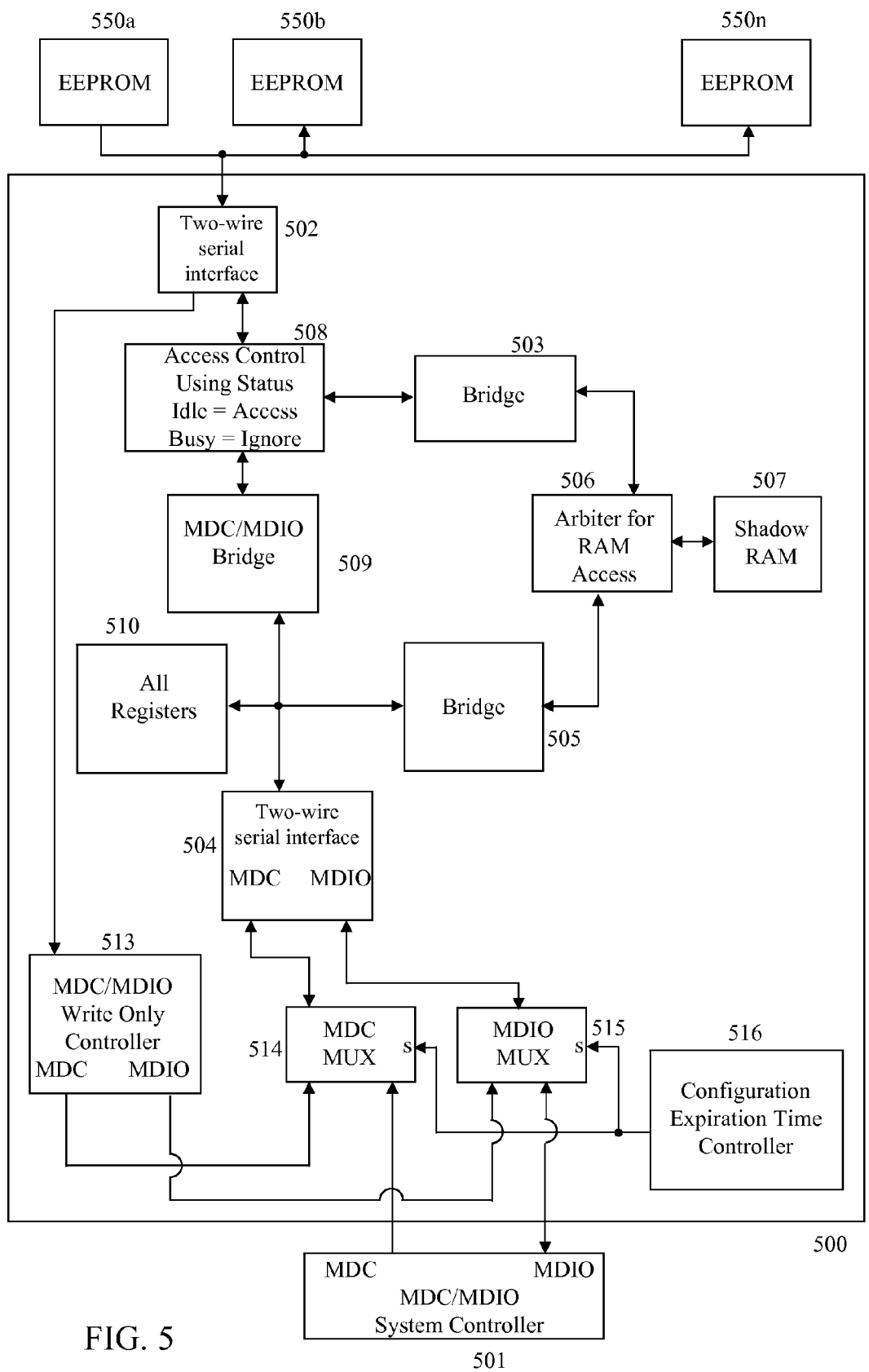
FIG. 5 shows an IEEE 802.3 compliant physical layer device according to a further embodiment of the present invention.

FIG. 5 shows a physical layer device according to a further embodiment of the present invention. In addition to retain content of a shadow RAM 507 when the system controller is powered down, the EEPROMs 550 are also used to configure the physical layer device 500. At the reset time, the content of the EEPROMs 550 is transferred to a MDC/MDIO write-only controller 513 via a two-wire serial interface bus 502. The MDC/MDIO write-only controller 513 is activated only during the reset time. The content of the EEPROMs is then written to a two-wire serial interface bus 504 via a MDC multiplexer 514 and a MDIO multiplexer 515, which are controlled by a system controller 501 and a configuration expiration time controller 516. When the EEPROMs are read at startup, the MDC multiplexer 514 and MDIO multiplexer 515 select the MDC/MDIO write-only controller 513. If a register in the physical layer device 500 needs updating, the contents of the EEPROMs is written to a two-wire serial interface bus 504. Once the entire EEPROMs are read and MDC/MDIO commands are transferred, the MDC multiplexer 514 and MDIO multiplexer 515 return control of the MDC/MDIO bus to the system controller 501. Next, the two-wire serial interface bus 504 communicates the configuration information to all registers 510, configuring any register in the physical layer device 500.

The EEPROMs 550 define content and addresses of these registers, and the addresses of the PHY, the PMA, the PMD and the PCS. At the reset time, proper configuration data are written to proper registers. Thus, the present invention uses the EEPROMs to configure the physical layer device, and saves a lot of pins used to configure the chip.

To further facilitate the data transfer and physical layer device configuration, the present invention divides the EEPROM spaces and allocates them for special purposes. In one embodiment, the 2048 bytes of an EEPROM are divided into 8 pages. Each page has 256 bytes and is accessible separately. Some of the pages could be dedicated for Xenpak specification compliance, and some of the pages could be dedicated for chip configuration.

Figure 6:
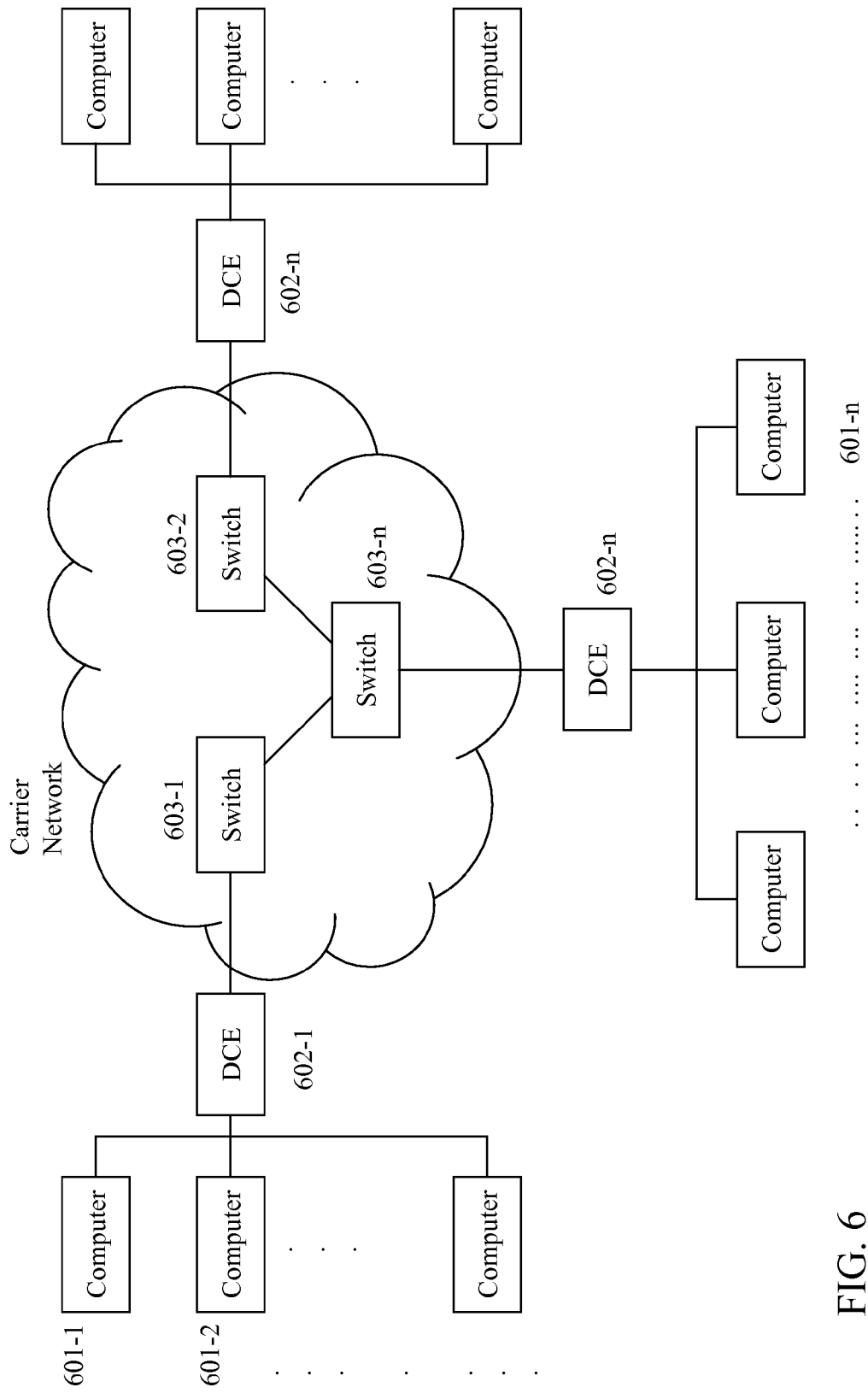
FIG. 6 shows a block diagram of a WAN which can use in its physical layer the physical layer device of the present invention.

The physical layer device of the present invention can be used in the physical layer of various types of communications networks, including but not limited to, WANs (Wide Area Networks), LANs (Local Area Networks), and MANs (Metropolitan Area Networks). FIG. 6 shows a block diagram of a WAN which can use in its physical layer the physical layer device of the present invention. As shown, the WAN 600 comprises a plurality of terminal equipment 601-1 to 601-n, such as computers; a plurality of DCE (Digital Communication Equipment) 602-1 to 602-n, such as modems; a plurality of switches 603-1 to 603-n, and a carrier network 604. Specifically, the present invention can be used in Ethernet ports, Ethernet switches, NICs (Network Adapter Cards), etc.

Although the physical layer devices described above are configured according to the Xenpak Specification, it should be understood that the present invention is applicable to other types of physical layer devices, e.g., physical layer devices configured according to XFP 10 Gigabit Small Form Factor Pluggable Module, Rev 3.1 ("XFP Specification"), SFP (Small Form-Factor Pluggable) and GBIC (Gigabit Interface Connector).

The IEEE 802.3ae Standard, the Xenpak Specification, the XFP Specification and the SFP Specification are incorporated herein by reference. It should be understood that the present invention is intended to apply to physical layer devices configured according to these Standard/Specifications, all of their preceding versions, and also all of their succeeding versions.

While the invention has been described in detail above with reference to some embodiments, variations within the scope and spirit of the invention will be apparent to those of ordinary skill in the art. Thus, the invention should be considered as limited only by the scope of the appended claims.

What is claimed is:

1. A physical layer device, comprising:
a volatile memory for storing configuration information for the physical layer device;
a first signal path comprising a first bridge for connecting the volatile memory and a system controller to communicate the configuration information for the physical layer device to the volatile memory;
a second signal path comprising a second bridge for communicating the configuration information between the volatile memory and at least one non-volatile memory;
a third signal path comprising a third bridge for reading and writing data between the at least one non-volatile memory and the system controller, bypassing the volatile memory; and
a write-only controller for writing the configuration information of the physical layer device from the at least one non-volatile memory,
wherein the first signal path and the second signal path are used when the entire content of the at least one non-volatile memory needs to be changed, and
wherein the third signal path is used when only a few bytes in the at least one non-volatile memory need to be changed.

2. The physical layer device according to claim 1, further comprising an access controller, wherein when receiving requests to access the at least one non-volatile memory from both the second bridge and the third bridge, the access controller gives priority to the earlier one of the requests.

3. The physical layer device according to claim 1, further comprising a register for storing the configuration information for the physical layer device from the at least one non-volatile memory.

4. The physical layer device according to claim 1, further comprising an arbiter for receiving requests to access the volatile memory from the first signal path and the second signal path and giving priority to the first signal path.

5. The physical layer device according to claim 1, wherein the volatile memory comprises a shadow RAM.

6. The physical layer device according to claim 1, wherein the at least one non-volatile memory comprises an EEPROM.

7. The physical layer device according to claim 3, further comprising a controller for deciding a configuration time for the physical layer device.

8. The physical layer device according to claim 1, wherein the volatile memory stores at least two bits for indicating data transfer status.

9. The physical layer device according to claim 1, wherein the system controller is a Management Data Clock/Management Data Input-Output (MDC/MDIO) system controller.

10. The physical layer device according to claim 1, further comprising a two-wire serial interface.

11. A physical layer device, comprising:
a volatile storing means for storing configuration information for the physical layer device;
a first communicating means comprising a first bridge means for communicating the configuration information for the physical layer device from a system controlling means to the volatile storing means;
a second communicating means comprising a second bridge means for communicating the configuration information between at least one non-volatile storing means and the volatile storing means;
a third communicating means comprising a third bridge means for reading and writing data between the at least one non-volatile storing means and the system controlling means, bypassing the volatile storing means; and a write-only controlling means for writing the configuration information of the physical layer device from the at least one non-volatile storing means, wherein the first communicating means and the second communicating means are used when the entire content of the at least one non-volatile storing means needs to be changed, and wherein the third communicating means is used when only a few bytes in the at least one non-volatile storing means need to be changed.

12. The physical layer device according to claim 11, further comprising an access controlling means, wherein when receiving requests to access the at least one non-volatile storing means from both the second bridge means and the third bridge means, the access controlling means gives priority to the earlier one of the requests.

13. The physical layer device according to claim 11, further comprising means for receiving requests to access the volatile storing means from the first bridge means and the second bridge means and giving priority to the first bridge means.

14. The physical layer device according to claim 11, wherein the volatile storing means comprises a shadow RAM.

15. The physical layer device according to claim 11, wherein the at least one non-volatile storing means comprises an EEPROM.

16. The physical layer device according to claim 11, further comprising a register for storing the configuration information for the physical layer device from the at least one non-volatile storing means.

17. The physical layer device according to claim 16, further comprising a controlling means for deciding a configuration time for the physical layer device.

18. The physical layer device according to claim 11, wherein the volatile storing means stores at least two bits for indicating data transfer status.

19. The physical layer device according to claim 11, wherein the system controlling means is a Management Data Clock/Management Data Input-Output (MDC/MDIO) system controller.

20. The physical layer device according to claim 11, further comprising a two-wire serial interface.

21. A method for controlling transfer of configuration information of a physical layer device, the method comprising:

writing the configuration information of the physical layer device by a system controller into a volatile memory in the physical layer device via a first signal path comprising a first bridge for connecting the volatile memory and the system controller;

communicating the configuration information from the volatile memory to at least one non-volatile memory via a second signal path comprising a second bridge between the volatile memory and at least one non-volatile memory;

reading and writing data via a third signal path comprising a third bridge between the at least one non-volatile memory and the system controller, bypassing the volatile memory; and downloading the configuration information from the at least one non-volatile memory to a write-only controller, wherein the first signal path and the second signal path are used when the entire content of the at least one non-volatile memory needs to be changed, and wherein the third signal path is used when only a few bytes in the at least one non-volatile memory need to be changed.

22. The method according to claim 21, further comprising receiving requests to access the at least one non-volatile memory from the system controller and the volatile memory, and giving priority to the earlier one of the requests when receiving both.

23. The method according to claim 21, further comprising writing the configuration information to at least one register.

24. The method according to claim 21, wherein the data is transferred without identifying a master.

25. The method according to claim 21, further comprising dividing one of the at least one non-volatile memory into a plurality of pages.

26. The method according to claim 21, further comprising indicating data transfer status by bits in the volatile memory.

27. A data transfer system comprising a system controller, a physical layer device according to claim 1, and at least one non-volatile memory.

28. A data transfer system comprising a system controller, a physical layer device according to claim 2, and at least one non-volatile memory.

29. A data transfer system comprising a system controller, a physical layer device according to claim 3, and at least one non-volatile memory.

30. A data transfer system comprising a system controller, a physical layer device according to claim 4, and at least one non-volatile memory.

31. A data transfer system comprising a system controller, a physical layer device according to claim 7, and at least one non-volatile memory.

32. A data transfer system comprising a system controlling means, a physical layer device according to claim 11, and at least one non-volatile storing means.

33. A data transfer system comprising a system controlling means, a physical layer device according to claim 12, and at least one non-volatile storing means.

34. A data transfer system comprising a system controlling means, a physical layer device according to claim 13, and at least one non-volatile storing means.

35. A data transfer system comprising a system controlling means, a physical layer device according to claim 16, and at least one non-volatile storing means.

36. A data transfer system comprising a system controlling means, a physical layer device according to claim 17, and at least one non-volatile storing means.

* * * * *